| 
US009261931B2

(12) United States Patent
    Bowling

(10) Patent No.: US 9,261,931 B2
(45) Date of Patent: Feb. 16, 2016

(54) PERIPHERAL SPECIAL FUNCTION REGISTER WITH SOFT-RESET DISABLE

(71) Applicant: Microchip Technology Incorporated, Chandler, AZ (US)

(72) Inventor: Stephen Bowling, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 282 days.

(21) Appl. No.: 13/753,375

(22) Filed: Jan. 29, 2013

(65) Prior Publication Data
    US 2013/0198500 A1    Aug. 1, 2013

Related U.S. Application Data

(60) Provisional application No. 61/593,496, filed on Feb. 1, 2012.

(51) Int. Cl.
    G06F 1/24    (2006.01)
    G06F 1/32    (2006.01)
(52) U.S. Cl.
    CPC . G06F 1/24 (2013.01); G06F 1/325 (2013.01)
(58) Field of Classification Search
    CPC ...................................................... G06F 1/325
    USPC ............................................................. 713/1
    See application file for complete search history.

(56) References Cited

U.S. PATENT DOCUMENTS

| 5,694,067 | A | * | 12/1997 | Hull et al. ............ 327/143 |
| 5,898,232 | A | * | 4/1999 | Reents et al. ............ 307/18 |
| 6,393,558 | B1 | | 5/2002 | Kim ............ 713/1 |
| 6,792,527 | B1 | | 9/2004 | Allegrucci ............ 713/1 |
| 7,890,916 | B1 | * | 2/2011 | Donlin et al. ............ 716/116 |
| 8,060,661 | B1 | * | 11/2011 | Wright ............ 710/8 |
| 2002/0144103 | A1 | * | 10/2002 | Kendall ............ 713/1 |
| 2004/0210349 | A1 | * | 10/2004 | Lenz et al. ............ 700/286 |
| 2005/0258995 | A1 | * | 11/2005 | Arimura ............ H03M 1/0621 341/155 |
| 2006/0036888 | A1 | * | 2/2006 | Warren et al. ............ 713/600 |
| 2006/0136755 | A1 | | 6/2006 | Qawami et al. ............ 713/300 |
| 2010/0299461 | A1 | * | 11/2010 | Osada ............ 710/57 |

FOREIGN PATENT DOCUMENTS

EP    0859976 B1    9/1999    ............... G06F 1/24

OTHER PUBLICATIONS

International Search Report and Written Opinion, Application No. PCT/US2013/024056, 9 pages, Apr. 22, 2013.

* cited by examiner

Primary Examiner — Chun Cao
Assistant Examiner — Chad Erdman
(74) Attorney, Agent, or Firm — Slayden Grubert Beard PLLC

(57) ABSTRACT

A microcontroller has a plurality of peripherals, and at least one control bit, wherein the control bit controls a reset of at least one peripheral such that in a first mode any type of reset resets the at least one peripheral of said plurality of peripherals and in a second mode only a power supply reset resets the at least one peripheral.

19 Claims, 2 Drawing Sheets

PERIPHERAL SPECIAL FUNCTION REGISTER WITH SOFT-RESET DISABLE

CROSS-REFERENCE TO RELATED APPLICATIONS

This application claims the benefit of U.S. Provisional Application No. 61/593,496 filed on Feb. 1, 2012, which is incorporated herein in its entirety.

TECHNICAL FIELD

The present disclosure relates to a peripheral unit, in particular to a peripheral function.register with soft-reset disable function.

BACKGROUND

Microcontrollers are well known in the art and comprise a microprocessor and associated control logic, memory as well as a plurality of peripheral devices within a single chip. For a microcontroller application, it is usually desired to have all registers controlling various parts of the device in the device reset to a known state on any kind of reset. This puts the device into a known starting state. A microcontroller differentiates between different types of reset events, such as power-on-reset (POR), brown-out-reset (BOR), memory-clear-reset (MCLR), software Reset, watchdog-timer-reset (WDT), etc.

The different type of resets fall generally into two categories, a hard and soft reset. A peripheral device would be required to stop operation during a hard reset whereas it could continue operation during a soft reset. Examples of hard reset events include POR or BOR events (voltage failure) where it would not be possible for the peripheral to continue operation. During soft reset events, conditions exist that could allow the peripheral to remain operational, for example, when the power supply is fully functional and within parameters, the clock is operating, etc.

As stated above, a microcontroller may comprise a plurality of different peripheral devices within a single chip. These devices will also be reset into a known state upon occurrence of any of the above mentioned hard or soft reset events. For example, a peripheral device may be a digital-to-analog-converter (DAC) peripheral, which may be used to supply a voltage reference to a circuit outside of the microcontroller. If a soft-reset occurs, this peripheral would be reset as well and therefore the function of the circuit outside of the microcontroller would be disabled.

SUMMARY

Hence, there exists a need for an improved configuration of peripherals in a microcontroller. In particular, a method and device is required that would allow a peripheral, for example, a Digital to Analog Controller (DAC) to maintain its output voltage during a reset of the MCU, allowing external circuitry controlled by the DAC to remain functional. According to various embodiments, such a DAC can for example be used as a reference voltage for a power supply. In conventional systems, in such an application, if the MCU software was reset, then the output of the external power supply would be interrupted. Hence, conventional systems required additional circuitry to either maintain or generate the respective output signal separate from the microcontroller.

In summary, a microcontroller may comprise a plurality of peripherals, wherein at least one peripheral comprises at least one control bit, wherein the control bit controls a reset of the peripheral such that in a first mode any type of reset resets the peripheral and in a second mode only a VDD reset resets the peripheral.

According to a further embodiment, the at least one peripheral can be a digital to-analog converter. According to a further embodiment, the at least one peripheral can be a reference voltage module. According to a further embodiment, the control bit can be a bit in a special function register controlling said at least one peripheral. According to a further embodiment, the VDD reset may encompass a power out reset and a brown out reset. According to a further embodiment, the at least one bit can be only reset by a VDD reset.

According to an exemplary embodiment, a microcontroller comprises a plurality of peripherals, and at least one control bit, for example in a special function register associated with a peripheral, wherein the control bit controls an operating mode of at least one peripheral such that in a first operating mode any type of reset resets the at least one peripheral of said plurality of peripherals and in a second operating mode only a power supply reset resets the at least one peripheral. According to a further embodiment, the at least one peripheral can be a digital to-analog converter, a reference voltage module, a timer, or an analog to digital converter. According to a further embodiment, the control bit can be a bit in a special function register. According to a further embodiment, the at least one control bit in the special function register may control only a reset function of said at least one peripheral. According to a further embodiment, the power supply reset may encompass a power out reset and a brown out reset. According to a further embodiment, the at least one bit may be reset only by a power supply reset. According to a further embodiment, in the second mode a soft reset does not reset the at least one peripheral. According to a further embodiment, the microcontroller may further have a flip-flop controlled by said at least one bit, wherein the flip-flop controls a multiplexer selecting a first type of reset signal or a second type of reset signal, wherein the second type of reset signal excludes soft resets.

According to another embodiment, a method for resetting a microcontroller comprising a plurality of peripherals, may comprise setting or clearing a control bit to select a first or second reset mode, wherein in the first reset mode any type of reset signal resets at least one of said plurality of peripherals and in a second reset mode only a power supply reset resets the at least one of said plurality of peripherals.

According to a further embodiment, the at least one peripheral may be a digital-to-analog converter or a reference voltage module. According to a further embodiment, the at least one peripheral can be an analog to digital converter, a timer or communication peripheral. According to a further embodiment, the control bit can be a bit in a special function register. According to a further embodiment, the control bit in the special function register may control only a reset function of said at least one peripheral. According to a further embodiment, the power supply reset may encompass a power out reset and a brown out reset. According to a further embodiment, the at least one bit may reset only by a power supply reset. According to a further embodiment, in the second mode a soft reset does not reset the at least one peripheral. According to a further embodiment, the method may further comprise selecting a reset signal by means of a multiplexer from a first type of reset signal and a second type of reset signal, wherein the second type of reset signal excludes soft resets.

According to yet another embodiment, a peripheral device has a reset function hand comprises a programmable control register with at least one control bit, wherein the control bit controls an operating mode of the peripheral such that in a first operating mode any type of reset resets the peripheral and in a second operating mode only a power supply reset resets the at least one peripheral.

DETAILED DESCRIPTION

The various embodiments disclosed allow a user to eliminate additional analog circuitry outside of the microcontroller, such as for example, a voltage reference or analog or digital buffer circuitry. Using the features provided by the various embodiments, for example, a DAC can maintain its output voltage settings for all types of reset events, excluding a POR or BOR reset. This feature allows the external circuit to maintain functionality regardless of the microcontroller reset status. Thus, the various embodiments allow a peripheral to optionally retain its configuration settings through a non-power reset event. According to an embodiment, the option can be selected using a control bit in the register. The peripheral can be any type of peripheral and is not limited to a digital to analog converter. For example, the peripheral could also be an analog to digital converter, a timer, a communication peripheral, a programmable reference voltage unit, etc. More than one peripheral can be designed to use the above mentioned functionality.

According to an embodiment, a bit can be provided in the primary control register of the peripheral called, for example, SRDIS (soft-reset disable). When SRDIS=0, the module control register(s) is reset on all types of device resets. This will cause the module to discontinue operation for all reset types. The SRDIS bit itself is reset only on a power reset event. A power reset occurs, for example, when the supply voltage for the MCU falls below a minimum operating level. Therefore, the SRDIS control bit will retain its state until power is lost. If SRDIS=1, the module control register(s) is reset only on a power reset according to an embodiment. The module control register(s) will retain their values if a soft reset occurs. Therefore, the peripheral can retain its configuration and is not affected by the soft reset. A soft reset could be, for example, a MCLR pin reset, software RESET instruction, or a watchdog timer reset. Other soft resets may exist.

A feature like this can also be implemented with a nonvolatile memory fuse according to an embodiment. This feature makes the peripheral function a standalone peripheral. If the peripheral has been initialized and power is retained, it will maintain functionality regardless of what happens to the MCU.

Figure 1:
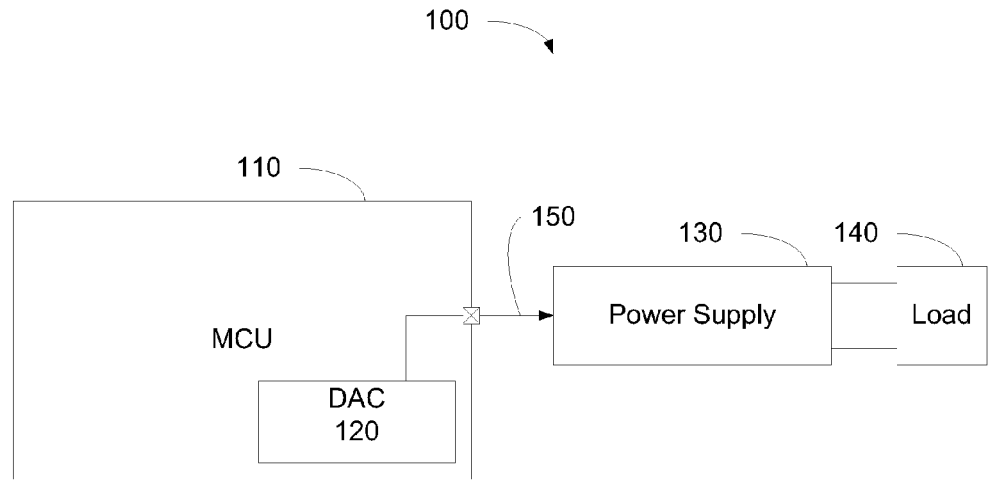
FIG. 1 shows an application of a microcontroller controlling a power supply according to an embodiment.
Figure 2:
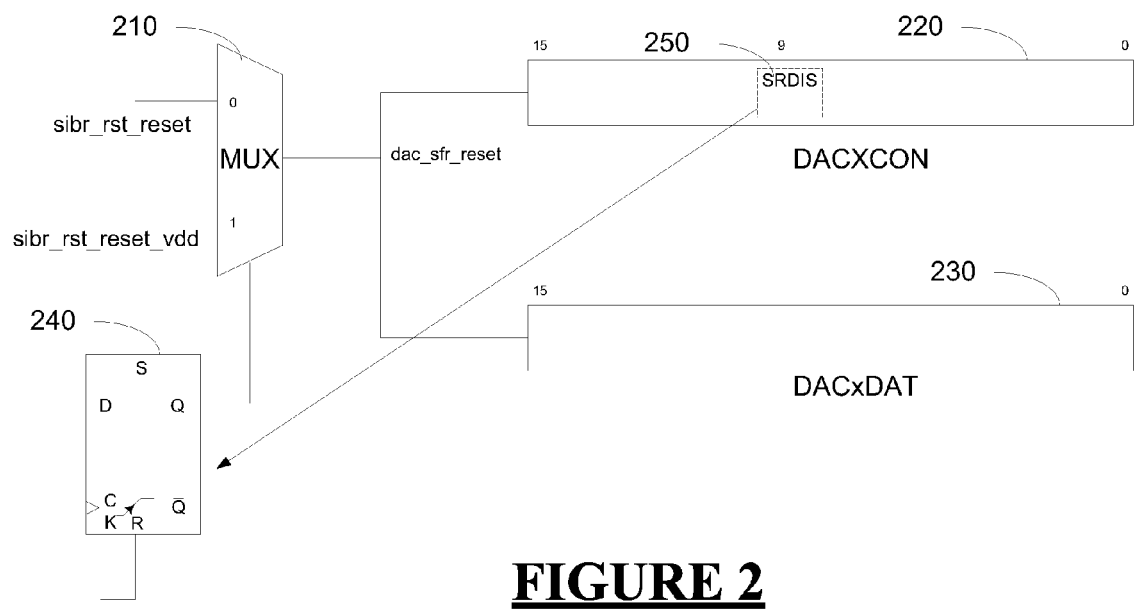
FIG. 2 shows an embodiment of a control register.

FIG. 1 shows a system with a microcontroller unit (MCU) 110 comprising a plurality of peripherals, wherein one peripheral, a digital-to-analog converter (DAC) 120 is shown as an example. Hence, in this application, one peripheral within the microcontroller 110, for example, this DAC 120 is used to control outside analog or digital circuitry 130, 140, for example, on a printed circuit board (PCB), in particular, e.g., a Power Supply unit (PSU) shown as power supply unit 130 and associated load 140. To this end, the microcontroller 110 comprises an external pin through which the analog voltage signal 150 can be fed to power supply 130. A user may wish to maintain continuous operation of such external circuitry 130, 140, even if a MCU reset occurs. As shown in FIG. 1, the MCU 110 controls the Power Supply 130 with, for example a reference voltage 150. If the MCU 110 is reset for any reason, the PSU operation will be interrupted in a conventional system. According to various embodiments, the peripheral can optionally maintain configuration through non-$V_{dd}$ reset events. To this end, as shown in FIG. 2, a control bit or flag 250 can be added to a peripheral special function register (SFR) 220, which for example, may be called 'SRDIS.' If SRDIS=0, then the peripheral register(s) are reset on all types of system resets. If SRDIS=1, then the peripheral register(s) are reset only on a Vdd reset (POR, BOR, etc). The SRDIS bit 250 itself is configured to be reset only on Vdd reset events. The different types of resets may be signaled through respective associated signal lines sib_rst_reset and sibr_rst_reset_vdd as shown in FIG. 2. Other reset signal lines may be used. For example, a single reset line may be provided and one or more additional control line may indicate the type of reset that occurred.

Figure 3:
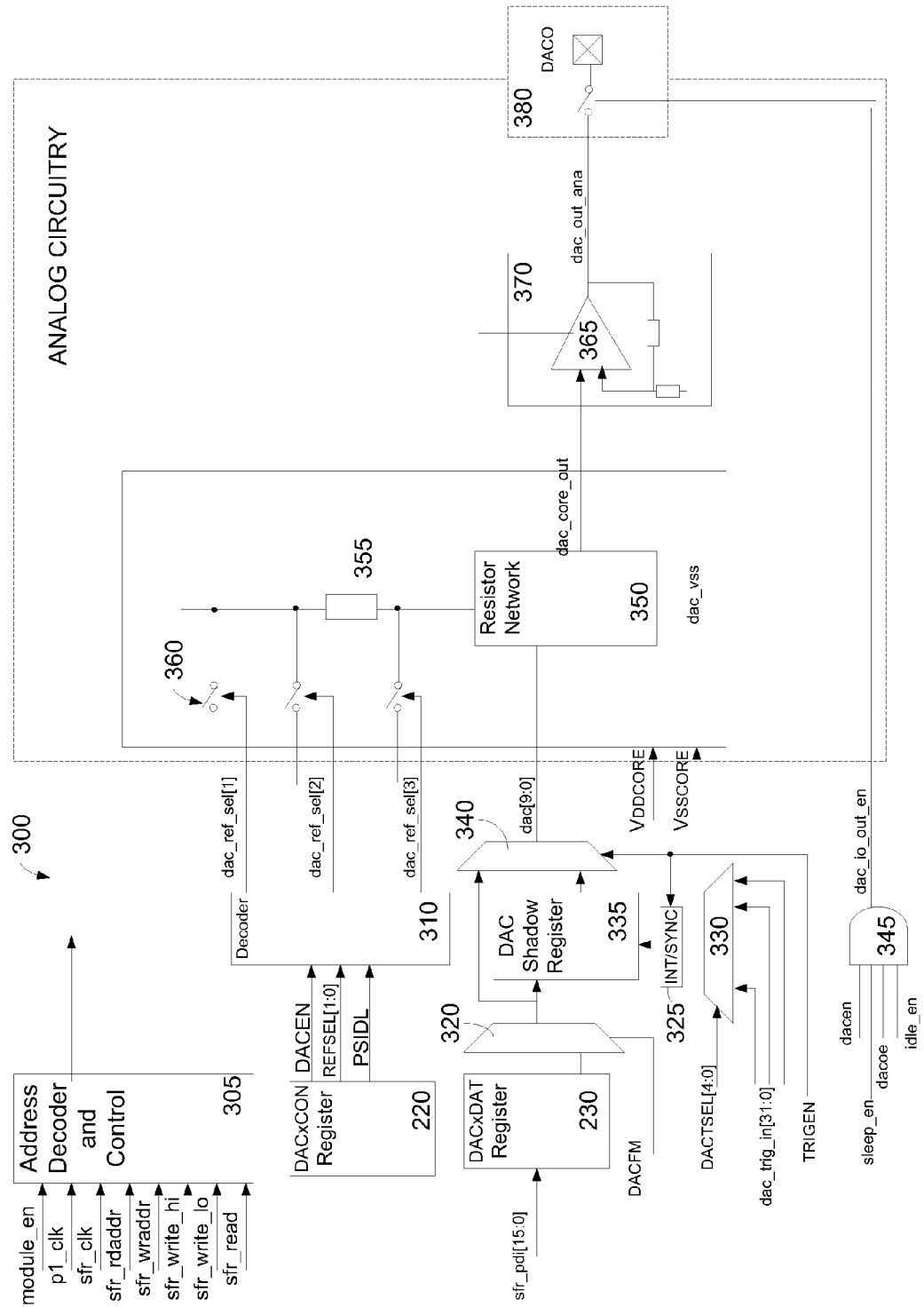
FIG. 3 shows a block diagram of a digital-to-analog converter module according to various embodiments.

The ADC according to various embodiments provides for an analog output voltage, proportional to the binary data written into the DACxDAT register 230 as shown in FIGS. 2 and 3. A module 300 as shown in FIG. 3 can be designed to control up to four sources of high-side voltage reference, selectable by using the REFSEL[1:0] bits in the DACxCON register 220. The voltage references itself are not shown, however, they may include an external voltage, the regular power supply and on chip voltage references.

The DACxCON register 220 controls module enabling and disabling, output enabling, and high voltage reference selection. The REFSEL[1:0] bits in the DACxCON register 220 select from one of four possible voltage reference sources for operation of the DAC. When DACEN=0, all the dac_ref_sel [3:0] outputs will be '0', causing the output of the DAC to be equal to its low-side reference, which is usually dac_vss.

The DACEN bit enables module operation. When disabled, the module will consume minimal power. The DACOE bit enables/disables the output of the DAC to the DACO device pin. in I/O port 380.

The data input register (DACxDAT) 230 specifies the DAC output value. The voltage output will be as follows:

$$VDAC = dac\_vss + ((DACxDAT / \log_2(DAC\_DLEN)) * (DACHREF))$$

wherein DACHREF is the high reference selected by the REFSEL[1:0] bits.

The DACOE bit in the DACxCON register 220, when set, enables the amplifier 370 to drive the pin function by enabling a switch in the I/O pad 380. When DACOE=0, the amplifier 370 will still function and be usable by internal modules. If no other output function is enabled for the I/O pad 380, it will float.

The DAC data output can be updated in one of two ways. When TRIGEN=0, the value of DACxDAT 230 is output to the analog portion of the DAC. The interrupts to the CPU core (dac_interrupt_8bit_out and dac_interrupt_16bit_out) will be '0' at all times. When TRIGEN=1, the value of DACxDAT 230 is only output to the analog portion of the DAC when it sees a positive edge on the trigger input, selected by the DACTSEL[4:0] bits controlling multiplexer 330. The selected trigger is synchronized and used to produce Interrupts to the 8/16-bit core via the interrupt outputs (dac_interrupt_8bit_out and dac_interrupt_16bit_out).

When the trigger is enabled, but no trigger actually occurs, the DAC will output the last available value in the Holding Register.

According to various embodiments as explained above, the DAC controller provides an option to retain its configuration through a soft-reset such as a WDT reset or MCLR reset. This allows the DAC to supply its output voltage as a reference to external circuitry via port 380, regardless of the CPU condition.

The soft-reset disable option is selected by setting the SRDIS bit 250 in the DACxCON register 220 to a '1' as shown in FIG. 2. When SRDIS=1, multiplexer 210 is controlled to select one of two reset signals via flip flop 240. Thus, two different reset signals can be directed to reset the registers 220 and 230. Hence, when SRDIS=1, all other bits in the DACxCON 220 and DACxDAT registers 230 will only be reset on a $V_{DD}$ Reset (sibr_rst_reset_vdd=1). When SRDIS=0, the contents of the DACxCON register 220 and DACxDAT register 230 will be reset on any type of device reset (normal operation).

The SRDIS bit may only affects the reset conditions for DACxCON and DACxDAT registers 220 and 230. According to such an embodiment, a user may need to ensure other DAC settings, such as the programmed DAC reference voltage level, do not change as a result of a reset. However, other implementations are possible that ensure that the output value remains enabled during a soft reset.

If the module_en input is cleared, the module 300 will be disabled, regardless of any SFR settings, and all SFRs are disabled and cannot be accessed. If the DAC module 300 is disabled (DACEN=0), regardless of the state of the DACOE bit, all analog circuitry is powered off (but SFRs can be accessed). When the Idle mode input goes high, the module can operate in one of two modes depending on the state of the PSIDL bit. When PSIDL=0, the module 300 operates without any change. If PSIDL=1, the module 300 shuts down when Idle goes high. This means all switches enabled by the REFSEL[1:0] bits are opened. The dac_io_out_en goes to '0' and the DAC I/O switch will be opened, tri-stating the DACO output in I/O pad 380.

A doze mode does not affect operation of the DAC 300. The DAC 300 continues to operate normally. When a sleep_mode input is high, all register updates to the DAC will cease, since q_clks will have stopped. However, the last value clocked into the DAC Shadow Register 335 will continue to drive the DACO pin 380 when PSLPEN=1. On the other hand, if PSLPEN=0, the dac_io_out_en goes to '0' and the DAC I/O switch in I/O pad 380 will be opened, tri-stating the DACO output. According to an embodiment, the DAC's analog amplifier 365 has a large start-up time when it is enabled. For this reason, the dac_enable_out output will remain high as long as the DACEN bit is set high, regardless of the state of the PSLPEN bit. This will keep the DAC's analog amplifier 365 enabled. This is useful for quick bring up of the DACO output when Sleep mode is exited.

FIG. 3 shows an exemplary digital control logic and includes the analog modules required to implement, for example, a 10-bit Digital to Analog converter. FIG. 3 shows address decoder and control unit 305, DAC control register 220 coupled with decoder 310, which may control switches for selecting one of various reference voltages. The data stored in DAC data register 230 can be coupled through multiplexers 320 and 340. A shadow register 335 may be provided and coupled between the multiplexers. The DAC itself may comprise a resistor network 350 and an amplifier 370 comprising an operational amplifier 365 as indicated. The analog section receives supply voltages $V_{DDCORE}$ and $V_{SSCORE}$. If the module_en=0, the clocks to the module are stopped, and the outputs are held in a benign state. The SFR registers should read as all 0's.

The INT/SYNC block 325 may be implemented between multiplexer 330 and DAC shadow register 335 to performs two functions: It may keeps the trigger inputs to the DAC glitch-free because the trigger inputs are connected directly to the holding flops. Care may be taken at the top level when choosing triggers. It also generates CPU interrupts; the selected trigger input is captured asynchronously and used to generate 8-bit and 16-bit core compatible interrupts, depending on a SYS_DATA_WIDTH parameter.

The DAC Shadow register 335 is used to reclock the DACxDAT when TRIGEN=1. The clock input to this register 335 is one of the Trigger Inputs (dac_trig_in[31:0]), one of which is selected by DACTSEL[4:0]. When TRIGEN=0, the dac_trig_in[31:0] inputs are ignored. The DACxDAT register is directly output to the analog macro.

The DAC soft-reset disable function and the DACxCON [SRDIS] control bit 250 may be enabled by the parameter SOFT_RST_DIS_PRESENT according to an embodiment. For proper operation of the soft-Reset disable function, the following must be satisfied according to an embodiment: The SRDIS control bit, when available, can only be reset by a VDD Reset (sibr_rst_reset_vdd=1). When the soft-reset function is available and SRDIS=1, the DACxCON and DACxDAT register values are reset only on a VDD Reset (sibr_rst_reset_vdd=1). When SRDIS=0, or the soft-reset disable function is not available, the DACxCON and DACxDAT registers 220, 230 will reset on any device Reset (normal operation).

While the functionality of the programmable reset function associated with a peripheral has been explained in combination with a digital to analog converter, as mentioned above, such a functionality is not limited to a such a peripheral but can be used with all types of peripherals whose output values whether digital or analog may remain during a soft reset event. With respect to an input type device such as an analog to digital converter, the operation of such a device is not interrupted during a soft reset event. For example, an ongoing digital conversion will not be interrupted by a soft reset and the controlling device may use the result of the conversion after it has been reset through the soft reset event.

What is claimed is:

1. A microcontroller comprising a plurality of peripherals wherein one of the peripherals is a digital to analog converter having an output coupled with an external pin of the microcontroller,
   wherein the microcontroller is operable to be reset by a power supply reset and wherein the microcontroller is further operable to generate an internally generated reset signal, and wherein the digital to analog converter is configurable through a configuration register comprising at least one control bit,
   wherein the control bit controls an operating mode of the digital to analog converter such that in a first operating mode, both the power supply reset signal and the internally generated reset signal reset the digital to analog converter and in a second operating mode only a power supply reset resets the digital to analog converter and wherein the digital to analog converter maintains an output voltage programmed though an associated special function register at the external pin.

2. The microcontroller according to claim 1, wherein a reset signal applied to the digital to analog converter disables the function of the digital to analog converter.

3. The microcontroller according to claim 1, wherein the at least one control bit in the special function register controls only a reset function of said at least one peripheral.

4. The microcontroller according to claim 1, wherein the power supply reset encompasses a power out reset and a brown out reset.

5. The microcontroller according to claim 1, wherein the at least one bit is reset only by a power supply reset.

6. The microcontroller according to claim 1, wherein in the second mode a soft reset does not reset the digital to analog converter.

7. The microcontroller according to claim 1, further comprising a flip-flop controlled by said at least one bit, wherein the flip-flop controls a multiplexer selecting a first type of reset signal or a second type of reset signal, wherein the second type of reset signal excludes soft resets.

8. A method for resetting a microcontroller comprising a plurality of peripherals wherein one of the peripherals is a digital to analog converter having an output coupled with an external pin of the microcontroller, the method comprising:
providing a power supply reset signal controlled by an external supply voltage;
providing an internally generated reset signal controlled by said microcontroller;
programming the analog to digital converter to generate an output voltage which is fed to an external pin of the microcontroller;
setting or clearing a control bit associated with the digital-to analog converter to select a first or second reset mode, wherein in the first reset mode the power supply reset signal or the internally generated reset signal resets the digital-to analog converter and in a second reset mode only a power supply reset resets the digital-to analog converter.

9. The method according to claim 8, wherein resetting the peripheral disables the function of the digital-to analog converter.

10. The method according to claim 8, wherein the control bit in the special function register controls only a reset function of said digital-to analog converter.

11. The method according to claim 8, wherein the power supply reset encompasses a power out reset and a brown out reset.

12. The method according to claim 8, wherein the control bit is reset only by a power supply reset.

13. The method according to claim 8, wherein in the second mode a soft reset does not reset the digital-to analog converter.

14. The method according to claim 8, further comprising selecting a reset signal by means of a multiplexer from a first type of reset signal and a second type of reset signal, wherein the second type of reset signal excludes soft resets.

15. A system comprising a microcontroller with a plurality of peripherals,
wherein the microcontroller is operable to be reset by a power supply reset and wherein the microcontroller is further operable to generate an internally generated reset signal, and at least one control bit,
wherein the control bit controls an operating mode of a peripheral digital-to analog converter such that in a first operating mode, both the power supply reset signal and the internally generated reset signal reset the digital-to analog converter and in a second operating mode only a power supply reset resets the digital-to analog converter,
wherein the digital to-analog converter generates an analog signal fed to an external pin of the microcontroller; and
a power supply receiving a voltage reference provided by the external pin.

16. The system according to claim 15, further comprising a load coupled with the power supply.

17. The microcontroller according to claim 1, wherein the internally generated reset signal is a software reset or a watchdog reset signal.

18. The method according to claims 8, wherein the internally generated reset signal is a software reset or a watchdog reset signal.

19. The system according to claim 15, wherein a reset signal applied to the digital to analog converter disables the function of the digital to analog converter.

* * * * *